United States Patent [19]

Smith et al.

[11] 4,418,390
[45] Nov. 29, 1983

[54] METHOD AND APPARATUS FOR MAKING A CODED CHART OF A COLOR SUBJECT

[76] Inventors: Rhoda J. Smith, 47 Basswood Ave., Sudbury, Mass. 01776; Harold H. Smith, 6021 Commack Ct., Springfield, Va. 22152

[21] Appl. No.: 209,537

[22] Filed: Nov. 24, 1980

[51] Int. Cl.³ .................... G06K 15/02; H04N 9/10; H04N 7/18
[52] U.S. Cl. .................... 364/526; 358/75; 358/78; 358/80
[58] Field of Search .................... 358/75, 76, 78, 80; 364/526; 356/400, 404

[56] References Cited

U.S. PATENT DOCUMENTS

| | | | |
|---|---|---|---|
| 3,710,020 | 1/1973 | Levin et al. | 358/78 |
| 3,745,037 | 7/1973 | Bowker | 358/78 X |
| 3,778,541 | 12/1973 | Bowker | 358/75 |
| 3,790,704 | 2/1974 | Collomosse et al. | 358/78 X |
| 3,814,932 | 6/1974 | Anati et al. | 356/405 X |
| 3,823,257 | 6/1974 | Oelmayer et al. | 358/78 |
| 3,934,083 | 1/1976 | Plath | 358/78 |
| 4,059,183 | 11/1977 | Hoskins | 400/126 |
| 4,250,522 | 2/1981 | Seki et al. | 358/76 |

*Primary Examiner*—Felix D. Gruber
*Attorney, Agent, or Firm*—Irving M. Kriegsman

[57] ABSTRACT

A method and apparatus are disclosed for making a coded chart of a color subject for use in creating a likeness of the subject by needleworking. An image of the subject is formed on a screen. The image is scanned, point by point, with a fiber optic probe and the light received by the probe is measured for color content using a set of phototubes and color filters. The analog output signals from the phototubes are converted into digital signals and fed into a computer where they are processed to determine the proper color needlecraft material to use for each picture element in the subject. Using this information, an image of the subject is produced on the display screen of a computer terminal, with each picture element in the image appearing as a symbol identifying its particular color. In addition, a color reproduction of the subject based on the color signals is generated on a color monitor. Any changes that may be desired or required after viewing the image and reproduction are made by entering messages into the computer through the computer terminal keyboard and/or by using a light pen. A printout of the picture elements is displayed on the computer terminal screen and a legend identifying the particular color of each particular symbol shown is then produced using a printer, the printout constituting the coded chart.

5 Claims, 3 Drawing Figures

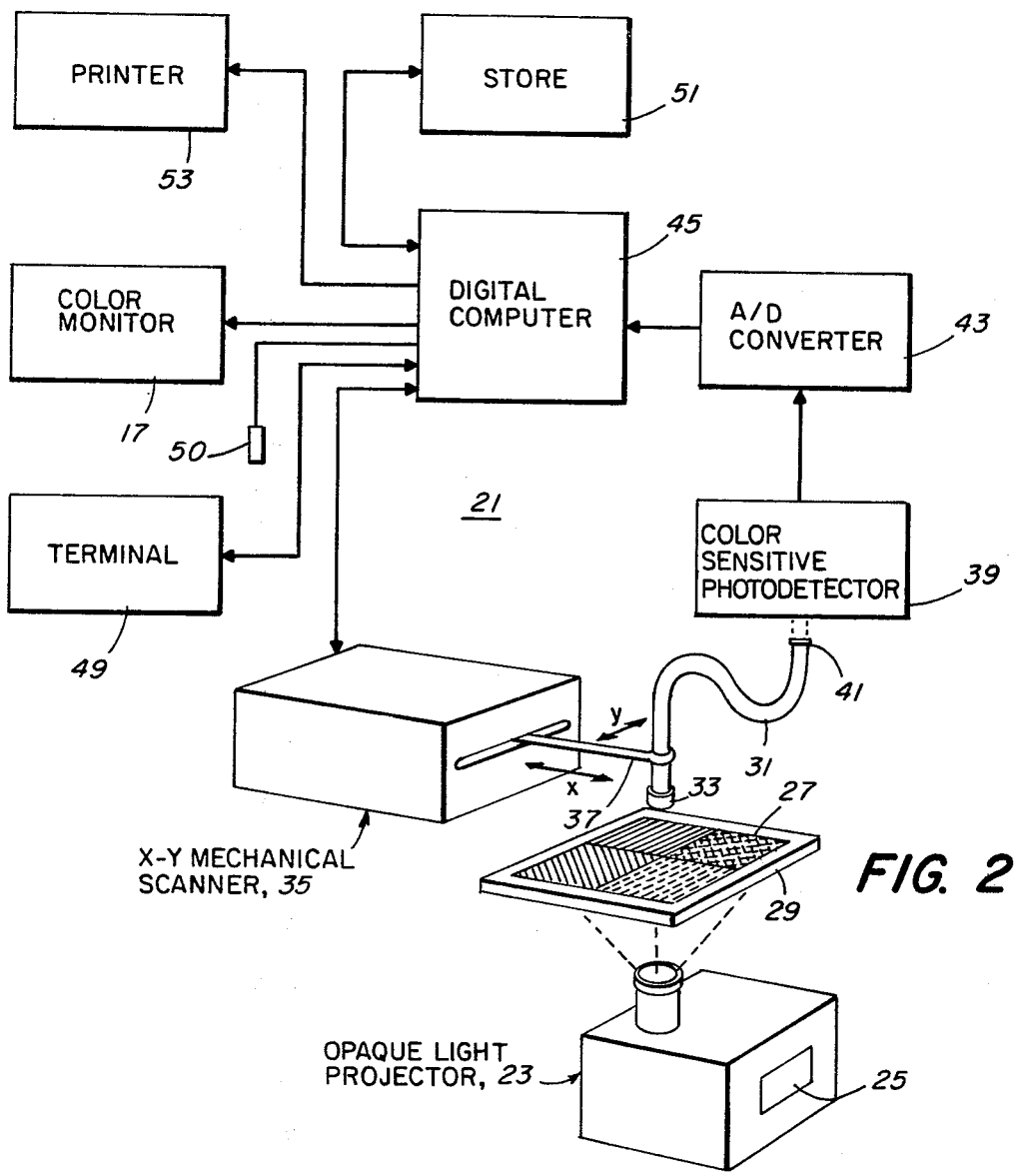
FIG. 2
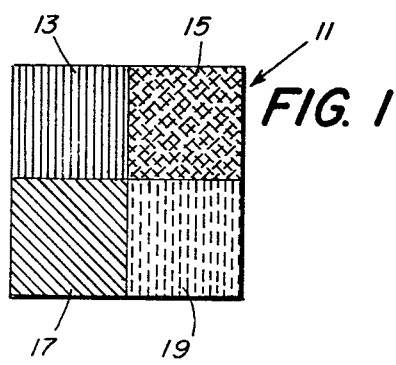
FIG. 1
FIG. 3
a = red
b = orange
c = green
d = purple

METHOD AND APPARATUS FOR MAKING A CODED CHART OF A COLOR SUBJECT

BACKGROUND OF THE INVENTION

The present invention relates to needleworking, and more particularly, to a method and apparatus for making a coded chart of a subject for use as a guide in making a likeness or copy of the subject by needleworking.

Needleworking, which is the art of making patterns or designs using a needle and thread or yarn, is a hobby that has been known and practised for several hundreds of years by millions of people throughout the world. Some of the more common forms of needleworking include needlepoint, crewel embroidery, crocheting and knitting. In some forms of needleworking, such as needlepoint and crewel embroidery, the particular pattern or design is constructed using a color coded chart of the pattern or design as a guide to determine what color material to use at each particular location on the picture.

In making a design or pattern by needlepoint, the stitches are counted and worked with a needle over the threads or mesh of a canvas foundation. If the needlepoint is worked on a canvas that has 16 to 20 or more mesh holes per inch, the work is called petit point. If the number of holes is between 7 and 16 per inch, the work is called pros point and if the mesh holes are less than 7 per inch it is known as quick point. The size canvas used by the needleworker is strictly a matter of choice.

The starting materials for making a design or pattern by needlepoint may comprise a blank sheet of canvas, a color coded chart showing the particular color of yarn or thread to use for each hole in the sheet of canvas, an instruction sheet explaining the particular type or types of stitches to use, a needle and a quantity of each one of the particular colored yarns or thread sufficient to make the design or pattern using the code chart and instruction sheet. The color coded chart will usually be in the form of a sheet of graph paper, with the number of squares or boxes corresponding to the number of holes in the mesh and with each square containing a symbol corresponding to the color needlecraft material to use at that location. A legend identifying what color each symbol represents will also be included. The materials may be in the form of a kit which is purchased by the needlepoint worker. However, quite often the needlepoint worker will obtain the color coded chart of the desired pattern and instruction sheet from a magazine or a design maker and then procure separately the proper size mesh canvas and colored yarn. The complexity of the color coded chart will, of course, vary depending on the detail of the pattern. An example of a color coded chart having a fair degree of complexity, may be found in the 1980 Fall Edition of McCall's Needlework and Needlecrafts, page 182.

Instead of a blank sheet of canvas and a color coded chart identifying the color material for each hole in the mesh, the starting materials for making a design or pattern by needlepoint may include a canvas having an outline of the particular design imprinted thereon, the outline being subdivided into outlined sections, each section constituting an area on the design having a particular color, and a color coded chart indicating the color material to use within each outlined section on the design.

In still another variation of needlepoint, the starting materials may include a sheet of canvas having the actual design printed thereon in color. In making the finished product using this arrangement, the needlepoint worker simply stitches each area on the colored design with the corresponding colored needlework material.

In another form of needleworking known as crewel embroidery, the pattern to be made is stitched onto a sheet of linen rather than a canvas mesh. The sheet of linen will usually include an outline of the pattern and the accompanying materials will normally include some form of chart showing the color of each different colored area in the outline.

In the past, color coded charts showing the color to be used for each mesh hole have been made by placing a sheet of coordinated (graphed) tracing paper over the picture to be copied or an enlarged or reduced sized version of the picture, tracing an outline of the picture on the tracing paper by hand, visually inspecting the color of the picture at each block on the tracing paper and then writing in each block a symbol corresponding to the color. The chart is either prepared by a design maker and then purchased by the needleworker or prepared by the needleworker himself. Some of the shortcomings of this technique for making a color coded chart are that it is very time consuming, is dependent at least partly on the manual skill of the tracer, and is dependent on the visual skills of the tracer in deciding the actual color to be placed into each box and carefully placing the correct symbol into each box. Color coded charts in which the pattern is divided into sections having the same color have been made by placing a blank sheet of tracing paper over the original, tracing an outline of each section having the same color by hand and then placing an appropriate symbol corresponding to the color in the section. This technique is also time consuming, is dependent on the manual and visual skills of the tracer and will not provide a very precise color correspondence to the original, especially if the original does not contain distinct, sharply defined color areas.

When the color is imprinted directly on the mesh canvas in color, a separate color coded chart usually is not necessary. However, some of the shortcomings of this arrangement are that the color materials to use corresponding to the colors in the picture are dependent on the visual skills of the needlepoint worker and that in most all cases at least some of the lines separating adjacent color sections on the picture will extend into the mesh holes causing confusion on the part of the needleworker as to which is the proper color to employ in the mesh holes. In either case, the resulting works will most often not be an accurate correspondence to the original.

As can be appreciated, the need exists for a new and improved technique for making a color coded chart of a color original, and more particularly a technique for accomplishing this which is fast, accurate and not dependent on the manual and visual skills of a tracer. It is envisioned that such a technique could be extremely useful in making a color coded chart for needleworking and design purposes (such as textile and other designing) of a photograph of portrait of a person or a particular scene or design (fabric) or a three-dimensional object that the needleworker would like to reproduce.

SUMMARY OF THE INVENTION

It is an object of this invention to provide a new and improved method and apparatus for making a coded chart of a color subject.

It is another object of this invention to provide a new and improved method and apparatus for making a coded chart of a color subject for use in creating a likeness or duplication thereof by needleworking.

It is another object of this invention to provide a method and apparatus of the type described above in which the color code chart is made by electrooptically determining the color of each picture element in the subject.

It is still another object of this invention to provide a method and apparatus of the type described above which is effective, is automatic, is extremely accurate and wherein a likeness of the subject based on the information that will appear on the coded chart can be easily produced for inspection and editing purposes.

It is yet still another object of this invention to provide a method and apparatus of the type described above in which the coded chart so obtained can be made in a matter of minutes or less.

It is another object of this invention to provide a method and apparatus of the type described above in which the information appearing on the coded chart can be easily stored for subsequent use.

It is another object of this invention to provide a method and apparatus of the type described above in which the number of different colors appearing in the coded chart can be easily varied to suit a particular set of requirements.

It is yet still another object of this invention to provide a method and apparatus of the type described above in which the subject may be multicolored or black and white and may be in the form of a picture (either a positive or a transparency) a sheet of fabric, or other materials such as glass or wood, a three dimensional object, etc., and need not be of the same physical size as the resulting coded chart.

It is another object of this invention to provide a method and apparatus of the type described above which does not require any manual tracing of an outline of the picture and is not based solely on visual inspection of the individual picture elements to determine their exact color.

The method of making a color coded chart of a subject according to the teachings of this invention involves photoelectrically scanning the subject, point by point, and generating analog electrical signals corresponding to the color content of the picture over the area scanned, converting the analog signals to digital signals, processing the digital signals in a computer to determine the color to be used for each picture element in the subject and then producing an image of the subject in which each picture element therein appears as a symbol representing its particular color.

The apparatus for making a coded chart of a color subject according to the teachings of this invention includes means for scanning the subject or an image thereof and generating analog electrical signals corresponding to the color content of each point in the subject being scanned, means for converting the analog signals into digital signals, a computer for processing the digital signals to determine the proper color of each picture element in the subject and means for producing an image of the subject, in temporary and/or permanent form, in which each picture element appears as a symbol representing its particular color.

The foregoing and other objects and advantages will appear from the description to follow. In the description, reference is made to the accompanying drawings which form a part thereof, and in which is shown, by way of illustrating, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts:

FIG. 1 is a plan view of a color picture;

FIG. 2 is a schematic diagram of an apparatus for making a coded chart of the color picture shown in FIG. 1 according to the teachings of this invention; and FIG. 3 is a plan view of a coded chart corresponding to the color picture shown in FIG. 2, constructed using the apparatus of FIG. 1.

DETAILED DESCRIPTION OF A PREFERRED EMBODIMENT

The present invention is directed to a novel technique for making a color coded chart of a subject for use in constructing a likeness of the subject by needleworking. The technique involves photoelectrically generating analog electrical signals corresponding to the color content at each point on the subject, converting the analog signals to digital signals, processing the digital signals with a computer to determine the proper color needlecraft material to use for each picture element on the subject and then producing an image of the subject in which each picture element appears as a symbol corresponding to its particular color.

Referring now to the drawings there is shown in FIG. 1 a plan view of a color print or picture 11 from which a color coded chart indicating the color material to use at each picture element in the picture may be prepared according to the teachings of this invention. For simplicity, color picture 11 is shown as comprising four rectangular areas 13, 15, 17 and 19, area 13 being red, area 15 being orange, area 17 being green, and area 19 being brown. It is to be understood, however, that the invention is not intended to be limited to color pictures of simple geometric designs such as shown in FIG. 1 but is applicable to other types of color pictures, especially color photographs, portraits, snapshots an pictures in magazines or books, to subjects other than pictures, such as sheets of fabric, metal or wood and three dimensional objects, to black and white or color transparencies and to black and white pictures (positives).

Referring now to FIG. 2, there is illustrated an apparatus 21 for making a color coded chart of color picture 11 by the principles of this invention.

Apparatus 21 includes an opaque light projector 23, shown symbolically in the form of a box. Color picture 11 is placed inside opaque projector 23 through a slot 25 and a color image 27 of the picture is projected upward onto a suitably positioned translucent screen 29. If the subject is in the form of a transparency rather than a print, then an image of the subject is projected onto a screen by transmission rather than reflection, using a type of light projector that projects an image by transmission rather than by reflection. Also, instead of forming the image by using a light projector and a translucent screen, a picture of the subject may be taken with a television camera, recorded in a video cassette and then played back on a television set, the picture appearing in the screen of the television set being the resulting image.

A photopickup device in the form of a fiber optic probe 31 is located directly above translucent screen 19 and its input end 33 is caused to scan color image 27, point by point, in a rectilinear manner. The scanning mechanism for producing the scanning movement of fiber optic probe 31 includes an x-y mechanical scanning device 35 and a bracket 37 which connects scanning device 35 to the input end 33 of fiber optic probe 31. Scanning device 35 is any type of conventional device which will produce rectilinear scanning and may be in the form of a plurality of suitably arranged cables and pulleys and a pair of motors, one motor for moving bracket 37 back and forth in the x direction and the other motor for moving bracket 37 a controlled distance in the y direction after each sweep in the x direction.

The color content of the light received by fiber optic probe 31 as it scans color image 27, point by point, is measured by a set of three color sensitive photodetectors 39 suitably positioned above and in close proximity to the output end 41 of fiber optic probe 31. One of the color sensitive photodetectors comprises a light detector whose input window is filtered by a red filter, another one of the color sensitive photodetectors comprises a light detector whose input window is filtered by a green filter and the third color sensitive photodetector comprises a light detector whose input window is filtered by a blue filter. The photodetectors may be in the form of phototransistors or photomultiplier tubes or silicon diodes and are positioned relative to the output end 41 so that each one receives an equal amount of light from output end 41 fiber optic probe 31. For example, the photodetectors may be positioned to define the apexes of an equilateral triangle and fiber optic probe 31 positioned below and at the center of the triangle. The amount of light received by each photodetector may be measured with the color filters removed and any inequalities in the light received by each easily corrected by adjusting the gains on the amplifiers (not shown) associated with each photodetector.

Alternatively, instead of positioning the three photosensitive light detectors to receive equal amounts of light from the output end of the fiber optic probe, equal amounts of light may be fed into the three photosensitive light detectors by splitting the fiber optic probe into three separate fiber bundles at the output end and then directing one of the fiber bundles to each one of the photosensitive light detectors. Also, instead of using a set of three color sensitive photodetectors and scanning the color image 27 a single time, the color content may be measured using a single photodetector and a set of three color filters and scanning the image three times, once with each color filter in front of the photodetector. The analog electrical signal outputs of the three light photodetectors 39 corresponding to the red, green and blue color content of the light received as fiber optic probe 31 scans color image 27 point by point are converted into digital signals by an analog to digital converter 43, which is coupled to photodetector 39.

The digital signals from analog to digital converter 43 are fed into a computer 45 where they are processed to identify the proper color needlecraft material corresponding to the color information received for each picture element on the color image 27. The number and size of the picture elements is controlled by the computer and is arranged to correspond to the desired number of mesh holes on the canvas which is to be used to make the needlework. For example, if the canvas is 40 mesh holes wide (i.e. contains 40 mesh holes in the x direction), the computer will use the digital information received at 40 equally spaced locations over each scan in the x direction. This may be achieved, for example, by a counting mechanism for counting fractions of a revolution of the drive shaft of the motor driving the scanner in the x direction. The counting mechanism may include a plurality of reflective markings equally spaced around the drive shaft, a continuous fine light beam directed against the drive shaft, a photodetector positioned to receive the reflected light each time the light beam impinges on a reflective marking, a counter for counting the electrical pulses emitted by the photodetector and a gate for triggering the computer to take a reading after a predetermined number of pulses. Thus, if probe 31 moves one inch in the x direction on each revolution of the drive shaft motor and six readings are required per inch, and there are twenty-four markings on the drive shaft, then the digital information will be converted to a color signal at every fourth marking and the signals between these readings will be discarded.

Alternatively, signals information may be obtained at desired incremental distances by using suitable timing circuits and controlling the speed of rotation of the motor moving the scanner in the x direction. The color signals are calculated by computer 45 by performing what is called a "table-look-up", that is, calculating what color (of the particular color materials to be used) corresponds (most closely), for example, to a red reading of 6, a blue reading of 4 and a green reading of 7. The programming can easily be predetermined by placing pieces of the different color material to be used such as yellow material, in front of probe 31 one at a time, and measuring the three readings obtained from the three light sensitive photodetectors. As can be appreciated, the number of picture elements at which the color is determined can be easily varied to correspond to the desired mesh size and overall dimensions of the canvas.

Using the color information signals so obtained, a color reproduction of color picture 11 may be reproduced, if desired, for inspection and/or editing purposes on a color monitor 47 connected to computer 45. At the same time, an image of the subject may be displayed on the screen of a terminal 49 connected to computer 45 wherein each picture element appears as a symbol such as "a", "b" and "c" identifying its particular color. Any changes in the picture, either desired or required, may be made by entering messages to computer 45 through the keyboard on terminal 49 and/or by using a light pen 50 connected to computer 45. For example, a light brown at one location may be changed to a dark brown if that color is considered more appropriate by the viewer or seems more realistic. Each time a change is made, the resulting color picture may be displayed on color monitor 47 and the "coded picture element" image displayed on the terminal display screen. The color information for each picture element may be stored in a store 51 connected to computer 45 for use at a later time, if so desired. When the picture as viewed on monitor 47 is deemed satisfactory, a hard (permanent) copy of the "coded picture element" image, as it appears on the screen of terminal 49 is produced by a printer 53 connected to computer 45. Also included in the printout is a legend identifying the symbol designating each color, i.e. a=red, b=orange etc. The resulting printout is the color coded chart.

A color coded chart 55 corresponding to color picture 11 is shown in FIG. 3. The array of symbols may be enclosed in separate squares, as shown, if desired to conform to the format as used in conventional color coded charts.

Although a particular embodiment of the invention has been described and illustrated herein, it is recognized that modifications and variations may readily occur to those skilled in the art and consequently, it is intended that the claims be interpreted to cover such modifications and equivalents.

For example, if sufficient light can be sensed directly from the subject, the projector may be dispensed with and the subject itself scanned by the fiber optic probe. Also, instead of using a fiber optic probe, the photodetectors can be mounted directly on the scanning bracket and the light fed into the photodetectors through a lens system mounted on the bracket. In addition, instead of equally positioning the three photodetectors to receive equal amounts of light from the photopickup device, the output beam from the photopickup device may be divided into three equal parts by optical means such as two beamsplitters, one having ⅓ reflectance and ⅔ transmissivity and ½ reflectance. Also, instead of using the computer to perform a "table-look-up", the colors can be identified directly by a colorimeter and then converted to digital form and fed into the computer. Furthermore, instead of using a fiber optic probe, the scanning may be achieved using a rotating mirror and appropriate focusing optics. In addition, a black and white color coded chart or a chart showing shades of grey can be easily obtained by replacing the set of color sensitive photodetectors with a single unfilteral photodetector and measuring changes in the intensity of the output signal. Finally, instead of using a set of three color sensitive photodetectors for measuring the red, green and blue color content, a set of more than three units such as a red, a yellow, a green and a blue may be employed, if desired.

What is claimed is:

1. A method of making a coded chart of a color subject on a sheet of paper for use as an aid in creating a likeness of the subject by needleworking on a mesh canvas, said mesh canvas having a plurality of holes, said method comprising:
   a. projecting a color image of the color subject on a translucent screen,
   b. scanning said color image in a rectilinear manner, a point at a time, using a photopickup device,
   c. measuring the red, green and blue color contents of the light received by the photopickup device as it scans the color image,
   d. converting the signals representative of the red, green and blue color content into digital signals,
   e. processing said digital signals in a computer to determine the proper color needlecraft material to use for each hole in said mesh canvas, and
   f. generating an image of said subject using said color information so derived on said sheet of paper, each picture element in the image corresponding to a single hole in said mesh canvas and appearing as a symbol corresponding to its color.

2. Apparatus for use in making a coded chart of a color subject for use in creating a likeness of said subject by needleworking on a mesh canvas, said mesh canvas having a plurality of holes, said subject being characterized by an array of picture elements, said apparatus comprising:
   a. means for forming a color image of said color subject,
   b. photopickup means,
   c. means for causing said photopickup means to scan said color image,
   d. means for measuring the color content of the light received by the photopickup means as it scans said color image,
   e. means for converting the color content signals into digital signals,
   f. a computer for processing said digital signals to determine the proper color needlecraft material to use for each hole in said mesh canvas, and
   g. a printer for making a printout of the color information so obtained, said printout being in the form of an image of the subject, with each picture element in the image corresponding to a single hole in said mesh canvas and appearing as a symbol corresponding to its particular color.

3. The apparatus of claim 2 and wherein said means for forming a color image of the color picture comprises an opaque projector.

4. The apparatus of claim 3 and wherein said photopickup device comprises a fiber optic probe.

5. The apparatus of claim 4 and wherein said means for measuring the color content of the light received by the photopickup device comprises a plurality of phototubes and color filters.

* * * * *